Sept. 3, 1940.   M. R. KUCZNIERZ   2,213,524
DRIVING MECHANISM FOR GRAMOPHONES
Filed July 30, 1938
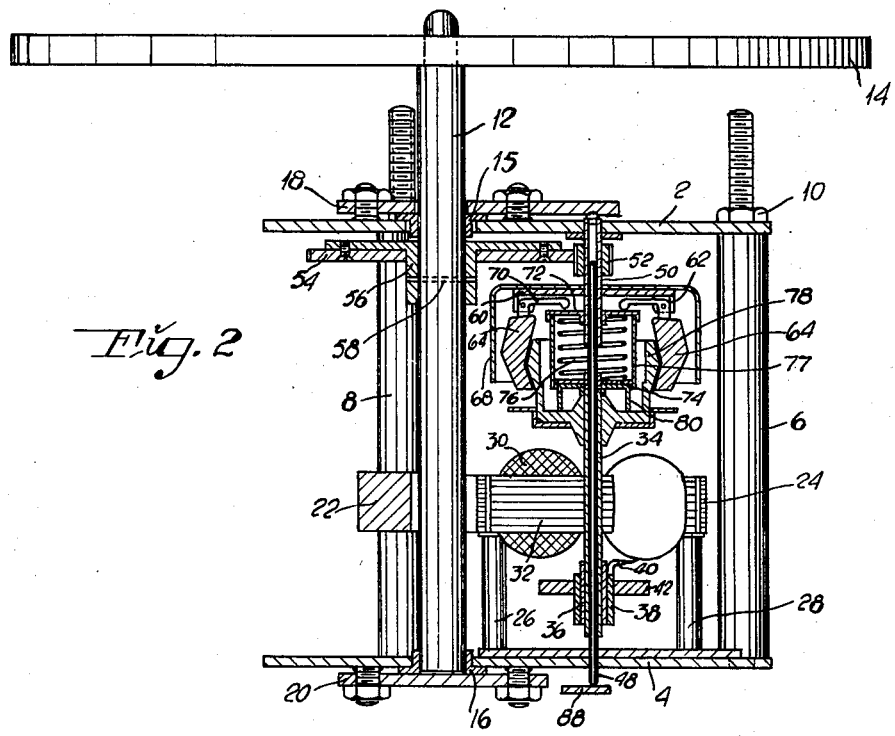
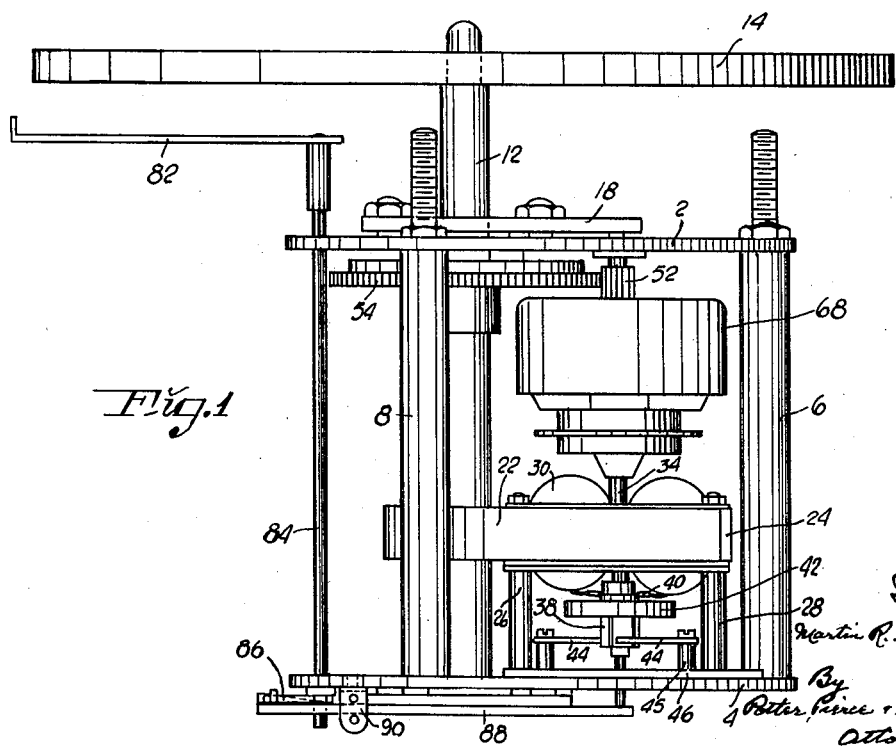

Patented Sept. 3, 1940

2,213,524

UNITED STATES PATENT OFFICE 2,213,524

DRIVING MECHANISM FOR GRAMOPHONES

Martin Richard Kucznierz, Stockholm, Sweden, assignor to Nordiska Svagströms Aktiebolaget, Stockholm, Sweden, a corporation of Sweden Application July 30, 1938, Serial No. 222,245
In Sweden July 31, 1937

5 Claims. (Cl. 192—104)

The present invention relates to driving mechanisms for Gramophones comprising an electric motor as prime mover and more particularly to a coupling and controlling device inserted in the power transmission from the electric motor to the record.

An object of the invention is to provide a coupling device between the armature shaft of the motor and the driven shaft of the driving mechanism, by means of which the speed of the last-mentioned shaft is automatically maintained as constant as possible.

Another object is to provide a coupling device of such a performance that it will not be possible to damage the electric motor by actuating the record plate. Thus, in case the field of the motor is created by permanent magnets, it may happen that the magnets will be demagnetized if the motor is braked abruptly or is driven in a direction opposite to its normal direction of rotation.

A further object of the invention is to provide a coupling for the purpose mentioned that fulfils its function with the least possible power consumption, that is the control has to take place without unduly wasting energy by frictional and braking losses.

Further objects and advantages of the present invention will be apparent from the following description, reference being had to the accompanying drawing, wherein a preferred form of embodiment of the present invention is shown.

Fig. 1 is a side elevational view of the driving mechanism, and

Fig. 2 is a vertical sectional view of the same, certain parts being omitted for the sake of clarity.

Referring to the drawing, a rigid frame structure for the mechanism is constituted by the supporting plates 2, 4 and three stanchions, only two of which 6, 8 are shown in the figures. These stanchions are rigidly secured to the lower supporting plate 4 and attached by threaded nuts 10 to the upper plate 2.

12 designates the driven shaft, on which the record supporting disc 14 is fastened. The shaft 12 is journalled in the bushings 15, 16, which are inserted in apertures in the plates 2 and 4, respectively, and clamped thereagainst by means of the parts 18, 20 fastened by screws and nuts to the plates 2, 4.

The electric motor is of a known type that is adapted to be driven by current from a dry cell of low tension of for instance 6 volts. The magnet system consists of a permanent horseshoe magnet 22 and laminated pole pieces 24. Symmetrically placed studs 26, 28 attached to the base plate 4 serve to hold the magnet system in its place. The armature is constituted of three coils 30 wound upon laminated iron cores 32, the inner ends of which are connected with each other in the usual manner and fastened to the armature shaft 34. Upon this shaft is placed an insulating sleeve 36, which carries the three commutator segments 38. Each segment has an elongated end 40, to which the armature coils are electrically connected. 42 is an insulating disc mounted upon the commutator segments and 44 designates resilient metal brushes which, by means of screws 45, are secured to the insulating sheet 46 and bear against the commutator in order to supply current to the armature.

The armature shaft 34 is tubular and surrounds a control shaft 48 provided for a purpose to be mentioned below. The shaft 48 is movable independently of the armature shaft 34 in the axial as well as in the turning direction. It extends beyond the hollow shaft 34 at both ends and protrudes into another hollow shaft 50, in which, too, it is free to move in all directions. The shaft 50 is journalled in the upper frame plate 2. On the shaft 50 there is fixed a pinion 52 which meshes with a gear wheel 54 screwed to a flanged sleeve 56 arranged on the shaft 12 and secured thereto by a pin 58.

Rigidly mounted on the shaft 50 is a disc 60 having lugs 62 in which two centrifugal weights 64 are suspended. Pivots, the axis of which are perpendicular to the plane of the drawing, enable the weights to swing outwards when the shaft 50 is driven at a sufficiently high speed. A cover 68 limits the deviation of the weights 64. Secured to the weights 64 are arms 70 which bear against a disc 72 loosely mounted on the shaft 50. Between the disc 72 and another disc 74 which is rigidly secured to the shaft 48 is inserted a helical spring 76. The flanged edge of the disc 72 embraces a cylindrical cover 77, in which the disc 74 forms a bottom which is displaceable against the action of the spring 76 by pushing the control shaft 48 upwards.

To the armature shaft 34 there is fixed a bowl-shaped member or drum 78, which forms one half of a slip coupling device, the other half being formed by the weights 64. The cooperating surfaces of the coupling halves are bevelled in two directions so that the halves, when engaged, will take a definite axial position relative to each other.

A disc or ring 80 is provided in the member 78 which bears against the disc 74 in the lowermost position of the latter.

At the side of and under the record holding disc 14 there is provided a control arm 82 fixed to the vertical rod 84 which is rotatably mounted in the frame plates 2 and 4. A pin 86 at the end of the rod cooperates with a sloping surface at the end of a lever 88 in such a manner that the lever is swung about its pivot at 90 when the arm 82 is rocked. The other end of the lever 88 bears against the lower end of the shaft 48 and will thus displace the same axially.

The coupling device works as follows: When the motor stands still the different parts take the position shown in the drawing, the spring 76 forcing the disc 72 upwards and by means of the arms 70 causing the weights 64 to engage the drum 78. Thus, the armature shaft 34 is positively coupled to the shafts 50 and 12. When the motor begins to run the speed of the disc 14 is at first proportional to the speed of the motor. As the motor speeds up the centrifugal forces acting on the weights 64 will counteract the action of the spring 76 and diminish the pressure exerted by the weights 64 on the drum 78. At a certain value of speed the pressure has diminished so much that the maximum torque transmitted will be equal to the braking moment of the Gramophone needle related to the shaft 50. When the motor speed rises over this value the coupling will begin to slip and the motor shaft 34 will run faster than the shaft 50. As the torque of the motor decreases with increasing speed, whereas the torque caused by the needle remains substantially constant, an automatic control will take place so that the speed of the shaft 12 will be automatically held at a desired value independently of the tension of the dry cell which feeds the motor. By adjusting the arm 82 it is possible to adjust the force of the spring 76 and thus to have the slip begin and the speed regulated at a certain desired speed.

It is obvious that minor changes in the details of construction and arrangement of the parts may be made without departing from the spirit of the invention as set forth in the appended claims.

What I claim is:

1. In a driving mechanism for Gramophones, a frame, a driven turntable shaft, an electric motor including a hollow armature shaft, a hollow intermediate shaft coaxial with said armature shaft journalled at one end in said frame and geared to said turntable shaft, a friction coupling connection between said armature shaft and said intermediate shaft comprising a friction drum mounted on said armature shaft and a pair of swinging weights carried by said intermediate shaft, and means for adjusting the action of said weights comprising an axially movable control shaft extending through both said armature shaft and said intermediate shaft and serving to maintain the two in axial alignment.

2. In a driving mechanism for a Gramophone turntable, a frame, a turntable shaft journalled in said frame, an electric motor mounted in said frame, said motor having a hollow armature shaft, an axially movable control shaft extending through and forming an axial bearing for said armature shaft, a friction drum mounted on the armature shaft for rotation therewith, an intermediate shaft journalled at one end in said frame and at its other end on said control shaft, centrifugal weights carried by said intermediate shaft adapted to engage the periphery of the drum carried by said armature shaft to form a friction coupling, and means carried by said control shaft for varying the degree of frictional engagement between said weights and said drum.

3. In driving mechanism of the character described, a frame, a driven shaft journalled in said frame, an electric motor mounted in said frame, said motor having a hollow armature shaft, an axially movable control shaft extending through and beyond both ends of said armature shaft and forming a journal therefor, a friction drum mounted on said armature shaft, an intermediate hollow shaft coaxial with said armature shaft and journalled at one end on said control shaft, centrifugal weights carried by said intermediate shaft adapted to engage the periphery of said drum to form a friction coupling between said armature shaft and said intermediate shaft, a helical spring for biassing the centrifugal weights into engagement with said drum, and means carried by said control shaft forming a support for said spring whereby axial movement of said control shaft controls the tension of said spring acting on said weights.

4. In driving mechanism of the character described, a frame, a driven shaft journalled in said frame, an electric motor mounted in said frame, said motor having a hollow armature shaft, an axially movable control shaft extending through and beyond both ends of said armature shaft and forming a journal therefor, a friction drum mounted on said armature shaft, an intermediate hollow shaft coxial with said armature shaft and journalled at one end on said control shaft, centrifugal weights carried by said intermediate shaft adapted to engage the periphery of said drum to form a friction coupling between said armature shaft and said intermediate shaft, said weights having inwardly extending arm portions, a disc slidable on said intermediate shaft and adapted to bear against the inner ends of said arms, a disc carried by said control shaft, a helical spring mounted between said discs whereby the tension of said spring is transmitted to said weights through said first mentioned disc and the tension of said spring is dependent on the axial position of said control shaft, and means to adjust the axial position of said control shaft.

5. In driving mechanism according to claim 4, a cylindrical housing for said helical spring, said disc slidable on said intermediate shaft constituting one end wall of said housing and said disc carried by said control shaft being axially displaceable within said housing.

MARTIN RICHARD KUCZNIERZ.